(12) United States Patent
Webb et al.

(10) Patent No.: US 10,245,655 B2
(45) Date of Patent: Apr. 2, 2019

(54) COLLETED BUSHING AND METHOD OF USE

(71) Applicant: The Boeing Company, Chicago, IL (US)

(72) Inventors: Jeremiah Webb, Mukilteo, WA (US); Douglas McCoy, Marysville, WA (US); Daniel Hippe, Seattle, WA (US)

(73) Assignee: The Boeing Company, Chicago, IL (US)

( * ) Notice: Subject to any disclaimer, the term of this patent is extended or adjusted under 35 U.S.C. 154(b) by 50 days.

(21) Appl. No.: 15/457,851

(22) Filed: Mar. 13, 2017

(65) Prior Publication Data

US 2018/0257149 A1    Sep. 13, 2018

(51) Int. Cl.
*B23B 47/28* (2006.01)
*B23B 49/02* (2006.01)
*B23B 51/10* (2006.01)

(52) U.S. Cl.
CPC .......... *B23B 49/023* (2013.01); *B23B 51/107* (2013.01); *B23B 47/287* (2013.01); *B23B 2247/08* (2013.01); *B23B 2251/60* (2013.01); *B23B 2260/042* (2013.01); *B23B 2260/0482* (2013.01); *B23B 2270/34* (2013.01)

(58) Field of Classification Search
CPC ....... B23B 47/28; B23B 47/287; B23B 49/02; B23B 49/023; B23B 2247/00; B23B 2247/08; B23B 2247/12; B23B 51/107; B23B 2270/34; B23B 2251/60; B23B 2260/042; B23B 51/07
See application file for complete search history.

(56) References Cited

U.S. PATENT DOCUMENTS

| | | | | |
|---|---|---|---|---|
| 1,621,137 A | * | 3/1927 | Seiler | B23B 47/28 408/104 |
| 2,656,190 A | * | 10/1953 | Towle | B24B 45/006 279/2.03 |
| 2,665,597 A | * | 1/1954 | Hill | B23B 49/00 408/82 |
| 4,815,902 A | | 3/1989 | Durfee | |

(Continued)

FOREIGN PATENT DOCUMENTS

CA    2941575 A1 * 3/2017 ............ F16B 13/124

OTHER PUBLICATIONS

Caarr-lane, "Carr-Lane_ID_Clamp", retrieved Feb. 20, 2017.

*Primary Examiner* — Daniel W Howell
*Assistant Examiner* — Chwen-Wei Su

(57) ABSTRACT

A colleted bushing includes a collet and a bushing. The collet has a collet proximal end and a collet bore having collet threads. In addition, the collet has a collet bore taper located adjacent the collet proximal end, and a plurality of collet fingers located adjacent the collet proximal end and configured to be inserted into a workpiece hole of a workpiece. The bushing has a bushing proximal end, a bushing bore, a bushing outer surface, and bushing threads formed along a section of the bushing outer surface. The bushing is configured to be inserted into the collet bore and the bushing threads are configured to engage the collet threads in a manner resulting in movement of the bushing proximal end into contact with the collet bore taper causing the collet fingers to be urged radially outwardly and removably locking the collet within the workpiece hole.

19 Claims, 13 Drawing Sheets

(56) References Cited

U.S. PATENT DOCUMENTS

| | | | | |
|---|---|---|---|---|
| 4,924,051 A | * | 5/1990 | Sebzda, Sr. | B23B 31/4013 |
| | | | | 219/69.15 |
| 5,549,308 A | * | 8/1996 | Bennett | B23B 31/207 |
| | | | | 279/157 |
| 5,820,314 A | * | 10/1998 | Dunbar | B23B 47/28 |
| | | | | 408/72 B |
| 9,598,183 B1 | * | 3/2017 | Kalisz | B64F 5/0036 |
| 2017/0073959 A1 | * | 3/2017 | Scarabelli | F16B 13/124 |

* cited by examiner

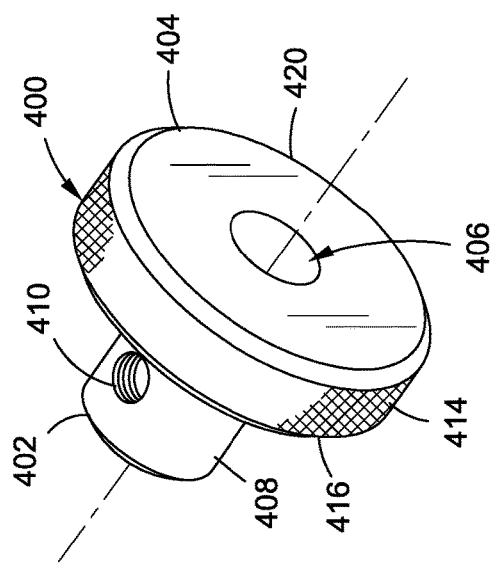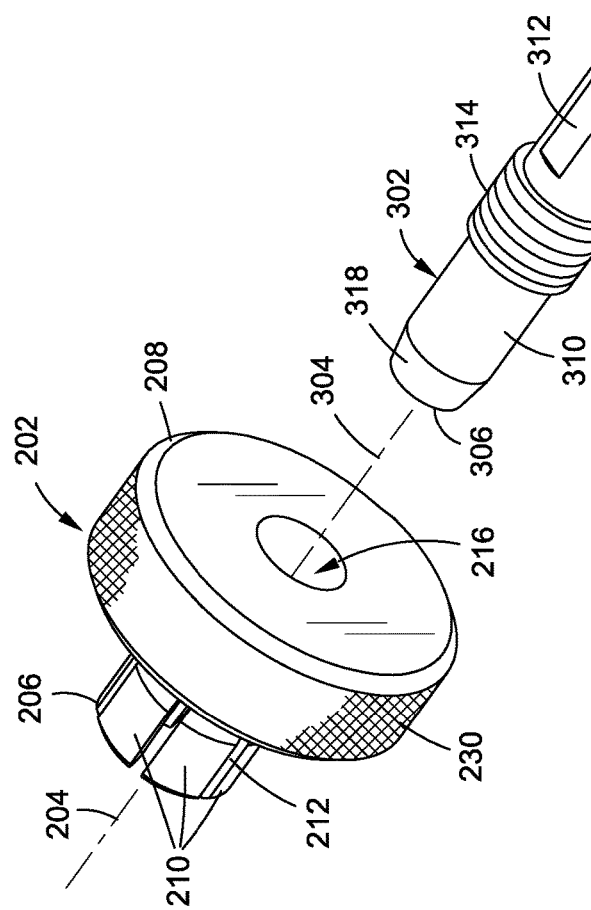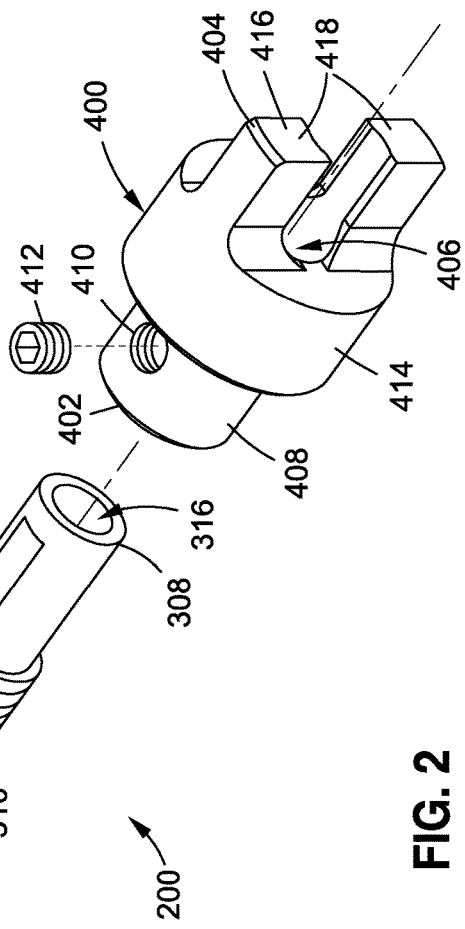

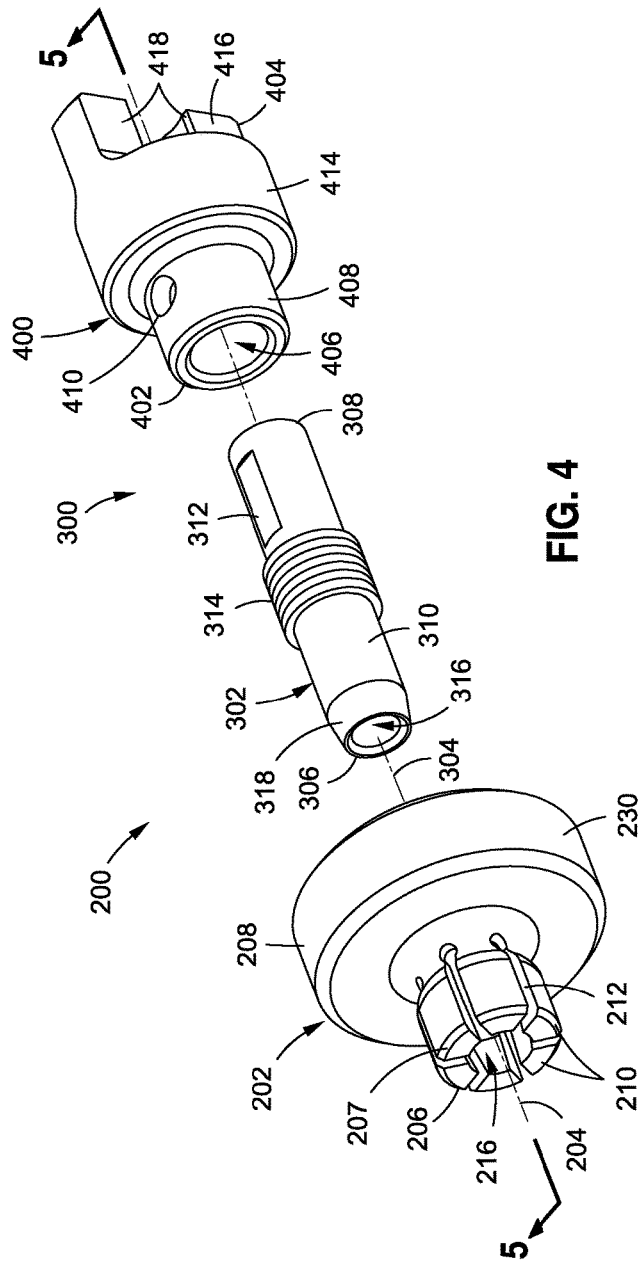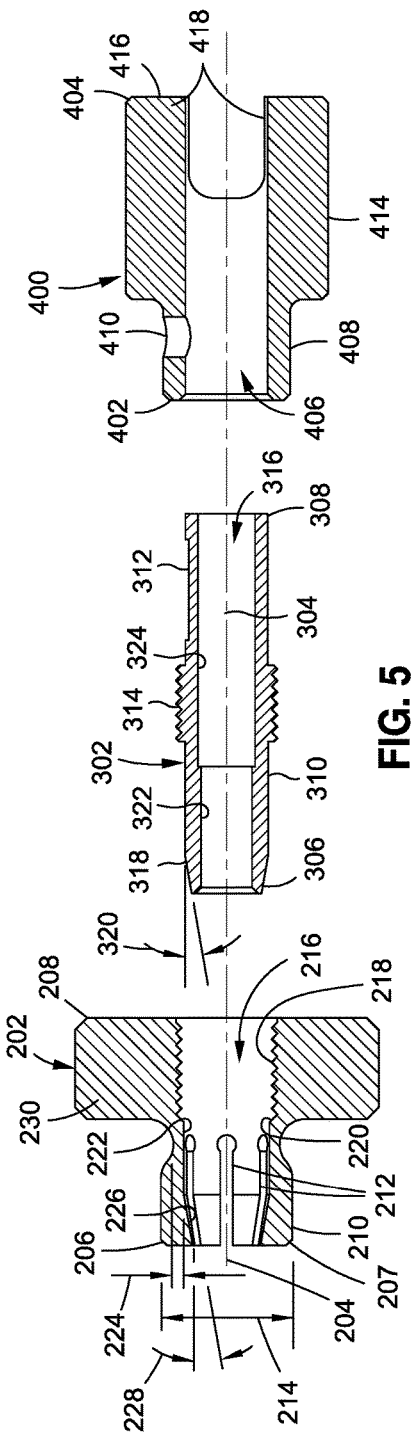
FIG. 4
FIG. 5

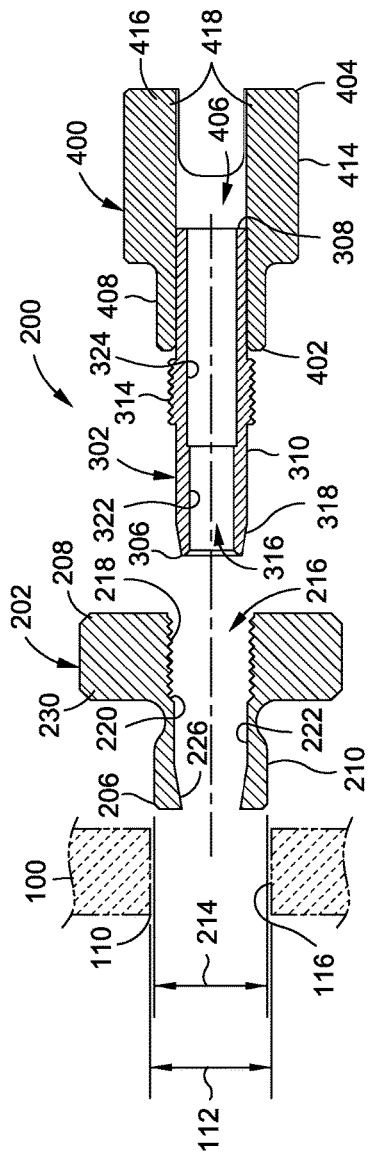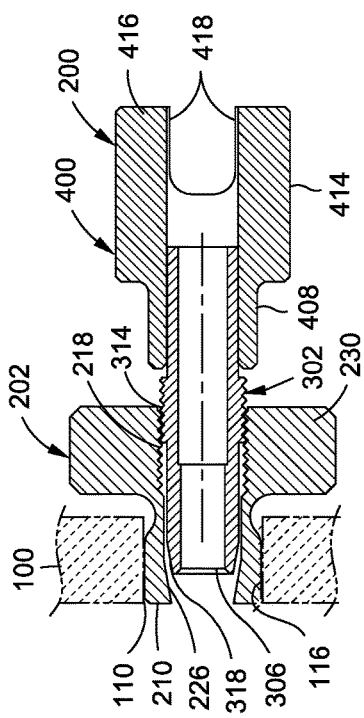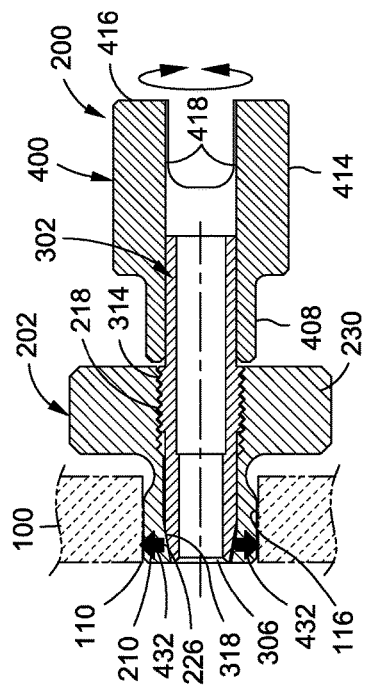
FIG. 6
FIG. 7
FIG. 8

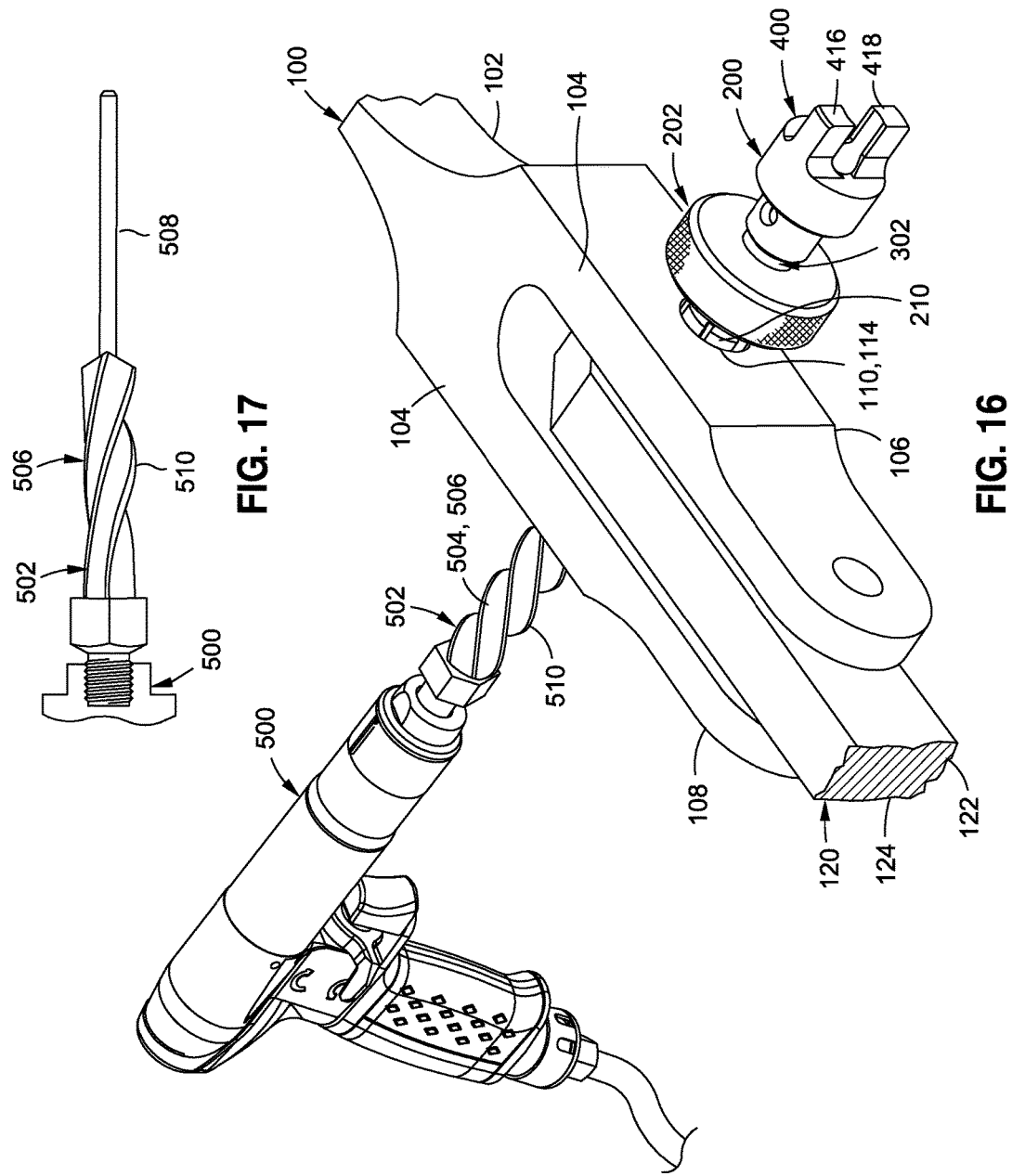

COLLETED BUSHING AND METHOD OF USE

FIELD

The present disclosure relates generally to drilling holes and, more particularly, to a colleted bushing capable of being removably locked within a hole in a workpiece and configured to guide a tool.

BACKGROUND

Conventional drill guides require a user to hold the drill guide in position within a hole of a first workpiece using one hand, while the user's opposite hand holds and operates a power drill having a drill bit that is extended through the drill guide for drilling a hole in a second workpiece. Unfortunately, holding the drill guide with one hand while operating the power drill with the opposite hand presents challenges in controlling and guiding the power drill. Furthermore, the process of drilling a hole generates torque, vibration, and/or shock, all of which is transmitted to the hand holding the power drill and which results in user fatigue. In addition, all of the weight of the power drill is supported by the hand holding the power drill which adds to user fatigue.

As can be seen, there exists a need in the art for a device and method that eliminates the need to hold a drill guide in position within a hole in a first workpiece when drilling a hole in a second workpiece using a power drill.

SUMMARY

The above-noted needs associated with drilling holes are specifically addressed and alleviated by the present disclosure which provides a colleted bushing that is lockable within a hole of a workpiece. The colleted bushing has a collet and a bushing. The collet has a collet proximal end and a collet bore having collet threads formed along a section of the collet bore. In addition, the collet has a collet bore taper located adjacent the collet proximal end. The collet includes a plurality of collet fingers located at the collet proximal end and which are configured to be inserted into a workpiece hole of a workpiece. The bushing has a bushing proximal end, a bushing bore, a bushing outer surface, and bushing threads formed along a section of the bushing outer surface. The bushing is configured to be inserted into the collet bore and the bushing threads are configured to engage the collet threads in a manner resulting in simultaneous rotational and axial movement of the bushing relative to the collet until the bushing proximal end contacts the collet bore taper causing the collet fingers to be urged radially outwardly and removably locking the collet within the workpiece hole. The bushing bore is configured to receive and guide a tool.

In a further embodiment, disclosed is a colleted bushing having a collet, a bushing, and a bushing adapter. As indicated above, the collet has a collet proximal end and a collet bore having collet threads formed along a section of the collet bore. In addition, the collet has a collet bore taper located adjacent the collet proximal end. The collet includes a plurality of collet fingers located adjacent the collet proximal end and configured to be inserted into a workpiece hole. The bushing has a bushing proximal end, a bushing bore, a bushing outer surface, and bushing threads formed along a section of the bushing outer surface. The bushing adapter is configured to be removably coupled to the bushing distal end. The bushing threads are configured to engage the collet threads via the bushing adapter in a manner resulting in simultaneous rotational and axial movement of the bushing relative to the collet until the bushing proximal end contacts the collet bore taper causing the collet fingers to be urged radially outwardly and removably locking the collet within the workpiece hole. The bushing bore is configured to receive and guide a rotary cutting tool.

Also disclosed is a method of performing a rotary cutting operation on one or more workpieces. The method includes inserting collet fingers of a collet into a workpiece hole of a first workpiece. The method additionally includes inserting a bushing into a collet bore of the collet. The method further includes engaging external bushing threads of the bushing with internal collet threads of the collet bore, and rotating the bushing relative to the collet causing axial translation of a bushing proximal end toward a collet proximal end. In addition, the method includes urging, in response to rotation of the bushing relative to the collet, the bushing proximal end against a collet bore taper located on a radially inner side of the collet fingers and causing the collet fingers to be pressured radially outwardly against an inner circumferential surface of the workpiece hole for rotationally and axially locking the collet and bushing concentrically within the workpiece hole. The method further includes inserting a tool such as a rotary cutting tool into the bushing bore and performing an operation on a second workpiece located adjacent to the first workpiece such as performing a rotary cutting operation on the second workpiece.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 2 is an exploded perspective view of the colleted bushing of FIG. 1 showing a collet, a bushing, and a bushing adapter having a pair of tabs for grasping the bushing adapter;

FIG. 3 is a perspective view of an alternative embodiment of the bushing adapter of FIG. 2 having a circular flange for grasping the bushing adapter;

FIG. 4 is a further perspective view of the colleted bushing of FIG. 2;

FIG. 5 is a sectional view of the colleted bushing of FIG. 4;

FIG. 6 is a sectional view of a collet prior to insertion into a workpiece hole, and further illustrating the collet fingers having a collet finger diameter that is no larger than the workpiece hole diameter prior to insertion of the collet into the workpiece hole;

FIG. 7 is a sectional view of the colleted bushing of FIG. 6 showing the bushing threadably engaged to the collet when the collet is inside the workpiece hole;

FIG. 8 is a sectional view of the colleted bushing of FIG. 7 showing the collet fingers urged radially outwardly against the inner circumferential surface of the workpiece hole as a result of the bushing proximal end being axially urged against a collet bore taper located on a radially inner side of the collet fingers;

FIG. 16 is a perspective view of a core drill bit enlarging a hole in the inner layer of the second workpiece;

FIG. 17 is a side view of an example of a core drill bit having a fluted section and a piloted section;

DETAILED DESCRIPTION

Figure 1:
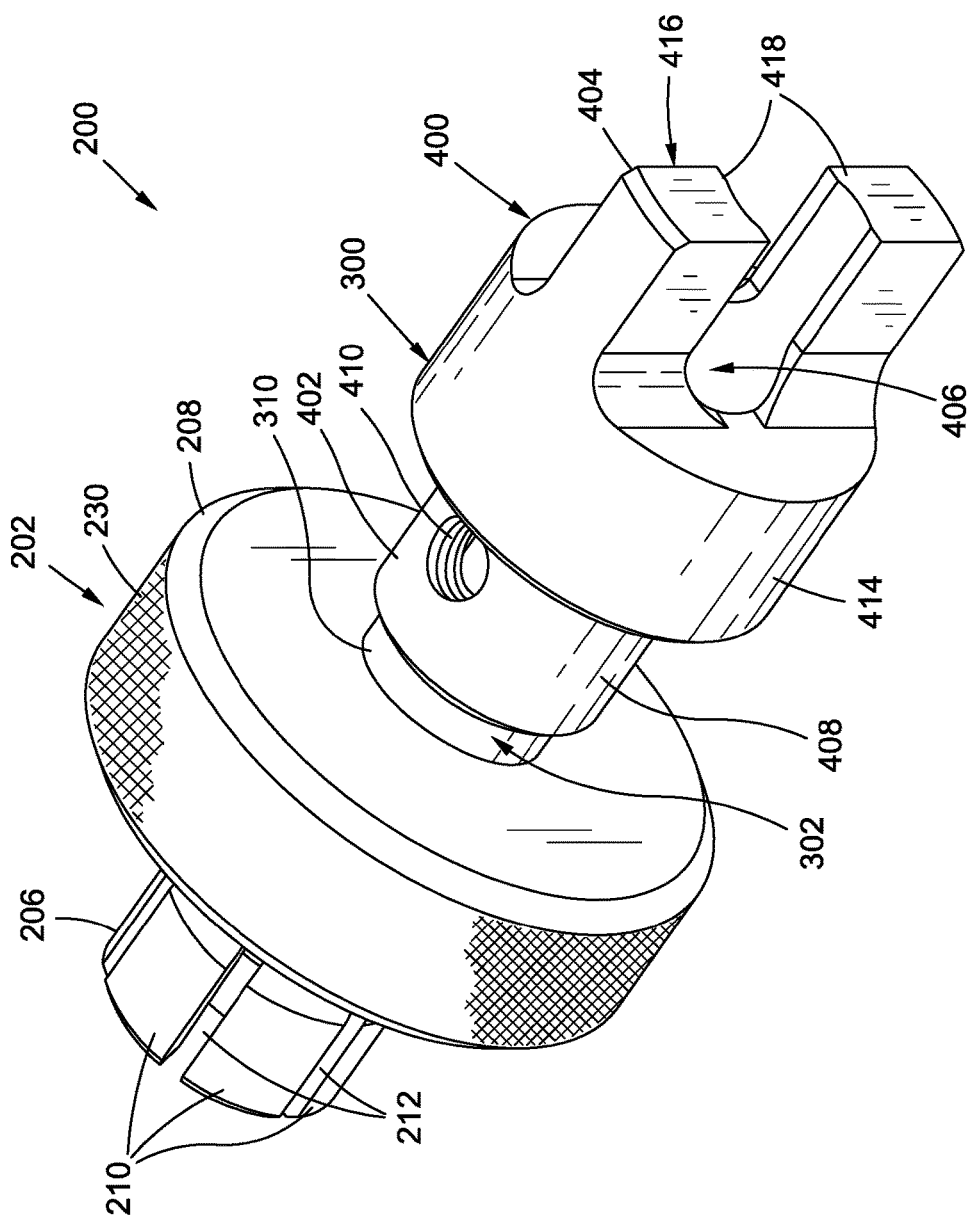
FIG. 1 is a perspective view of an example of a colleted bushing shown in an assembled state.

Referring now to the drawings wherein the showings are for purposes of illustrating preferred and various embodiments of the disclosure, shown in FIG. 1 is an example of a colleted bushing 200. As described in greater detail below, the colleted bushing 200 is configured to be rotationally and axially locked concentrically within a hole of a workpiece (e.g., FIGS. 8, 11, and 15), and receive and guide a tool such as a rotary cutting tool 502 (e.g., FIG. 16-19) for performing an operation such as a rotary cutting operation on one or more workpieces. For example, as shown in FIGS. 13-20 described below, the colleted bushing 200 may be concentrically locked within a workpiece hole 110 of a first workpiece 100 (e.g., FIGS. 13-15), and may receive a drill bit 504 (e.g., FIGS. 16-18) for hands-free aligned drilling or enlargement of a hole in a second workpiece 120 (e.g., FIG. 19) located adjacent to the first workpiece 100. Although the colleted bushing 200 is described in the context of drilling a hole in one or more workpieces, the colleted bushing 200 may be implemented for receiving and guiding any one of a variety of different types of tools including stationary tools (not shown), reciprocating tools (not shown), and/or rotary cutting tools 502 including, but not limited to, a reamer, a countersinking bit, and a counterboring bit. In addition, the colleted bushing 200 may be configured to receive a thread-forming tool such as a tap for forming internal threads in a hole of a second workpiece 120 located adjacent to the first workpiece 100 within which the colleted bushing 200 is concentrically locked.

Advantageously, the presently-disclosed colleted bushing 200 is configured to allow a user to quickly and effectively lock the colleted bushing 200 concentrically within an existing hole (FIGS. 13-20). In this regard, the colleted bushing 200 eliminates the need for a user to hold a bushing 302 in a workpiece hole 110 with one hand, while the user's opposite hand holds and guides a hand-held powered device to which a tool is secured while the tool is inserted into and guided by the colleted bushing 200. For example, the colleted bushing 200 eliminates the need for a user to hold the bushing 302 in a workpiece hole 110 with one hand, while the user's opposite hand holds and guides a power drill 500 while drilling a hole in an adjacent workpiece using a drill bit 504 secured to the power drill 500 and guided by the colleted bushing 200. The colleted bushing 200 allows the user to have both hands on the power drill 500 to support and guide the power drill 500 during the drilling of a hole, enabling the user to more accurately control the operation of the power drill 500 and maintain the drill bit 504 in perpendicular relation to the workpiece hole 110, thereby reducing or eliminating non-conformance rejections for out of tolerance holes. In addition, the ability to hold and guide the power drill 500 with both of the user's hands allows torque, vibration, and/or shock generated during a drilling operation to be distributed to both of the user's hands instead of subjecting a single hand to all of the torque, vibration, and shock. In addition, the ability to support the weight of the power drill 500 with both of the user's hands reduces user fatigue that would otherwise occur if the weight of the power drill 500 were supported by a single hand.

Referring to FIGS. 1-5, the colleted bushing 200 includes a collet 202, a bushing 302, and optionally a bushing adapter 400 configured to be coupled to the bushing 302. The collet 202 has a collet proximal end 206, a collet distal end 208, and a plurality of collet fingers 210 located at the collet proximal end 206. The collet fingers 210 may be radially spaced apart via lengthwise slots 212 between adjacent pairs of collet 202 fingers. The collet fingers 210 are sized and configured to be inserted into a workpiece hole 110 of a workpiece. The collet fingers 210 collectively define a collet finger diameter 214. The lengthwise slots 212 separating the collet fingers 210 may be at least as long as the depth of the workpiece hole 110 into which the collet 202 is intended to be installed. In this regard, the depth of the workpiece hole 110 may be defined by the thickness of the workpiece. In some examples, the collet fingers 210 may have a length in the range of from 0.25-2.0 inch. However, in other examples, the lengthwise slots 212 may be shorter than the depth of the workpiece hole 110. For example, the collet fingers 210 may have a length that is no less than half the depth of the workpiece hole 110 or no less than half the thickness of the workpiece. The distal end of each lengthwise slot may be radiused to minimize stress concentrations in the collet 202 during radially inward deflection of the collet fingers 210 or during radially outward deflection of the collet fingers 210.

In FIGS. 1-5, the collet 202 further includes a collet bore 216 extending from the collet proximal end 206 at least partially toward the collet distal end 208. In the example shown, the collet bore 216 could extend completely through the length of the collet 202. The collet bore 216 includes collet threads 218 formed along a lengthwise section of the collet bore 216. In addition, the collet bore 216 includes a collet bore taper 226 which may be described as a lengthwise section along which the collet bore 216 reduces in diameter along a direction toward the terminal end of the collet fingers 210.

The bushing 302 has a bushing proximal end 306, a bushing distal end 308, and a bushing bore 316 which is open at the bushing proximal end 306 and extends at least partially through the bushing 302 toward the bushing distal end 308. The bushing 302 further includes a bushing outer surface 310 and bushing threads 314 formed along a lengthwise section of the bushing outer surface 310. The bushing 302 is sized and configured to be inserted into the collet bore 216 and the bushing threads 314 are configured to engage the collet threads 218 in a manner resulting in simultaneous rotational and axial movement of the bushing 302 relative to the collet 202 until the bushing proximal end 306 contacts the collet bore taper 226 causing the collet fingers 210 to be urged radially outwardly into direct physical contact with and pressured against the inner circumferential surface 116 of the workpiece hole 110 resulting in rotationally and axially locking the colleted bushing 200 concentrically within the workpiece hole 110.

The collet threads 218 and the bushing threads 314 may be formed in any one a variety of different thread geometries. For example, the collet threads 218 and the bushing threads 314 may each be formed as unified national course (UNC) threads, as unified national fine (UNF) threads or in any one a variety of other thread geometries. In one example, the collet threads 218 and the bushing threads 314 may be formed as 0.25 inch×20 threads per inch UNC threads or as 0.25 inch×28 threads per inch UNF. In another example, the collet threads 218 and the bushing threads 314 may be formed as 0.375 inch×16 threads per inch UNC or 0.375 inch×16 24 threads per inch UNF. In still another example, the collet threads 218 and the bushing threads 314 may be formed as 0.50 inch×13 threads per inch UNC or as 0.50 inch×20 threads per inch UNF.

Referring to FIG. 5, the bushing bore 316 is configured to receive and guide a tool which, as mentioned above, may be a stationary tool (not shown), a reciprocating tool (not shown), and/or a rotary cutting tool 502. In the context of guiding a rotary cutting tool 502, the bushing bore 316 may include a main diameter portion 322 which may be sized complementary to the diameter of the rotary cutting tool 502 that is to be inserted into the bushing bore 316. In this regard, the bushing 302 may be provided in any one a variety of different sizes and configurations complementary to different sizes and configurations of tools including rotary cutting tools. For example, referring briefly to FIG. 18, the main diameter portion 322 of the bushing bore 316 may be sized to provide a clearance fit with a piloted section 508 of a core drill bit 506. In the present disclosure, a clearance fit may be described as a difference in diameter of approximately 0.0005 inch or more. In some examples, the main diameter portion 322 may be substantially equivalent to the diameter of the drill bit 504 to be guided by the colleted bushing 200. In other examples, the diameter of the main diameter portion 322 of the bushing bore 316 may be no more than approximately 0.010 inch larger than the diameter of the section of the drill bit 504 to be guided by the main diameter portion 322. The diameter of the bushing outer surface 310 may be smaller than the diameter of the collet bore main portion 222 by up to approximately 0.20 inch. The length of the main diameter portion 322 may be at least two times the diameter of the main diameter portion 322.

In FIG. 5, the bushing bore 316 may include an enlarged diameter portion 324 that may have a larger diameter than the main diameter portion 322 of the bushing bore 316. In one example, the enlarged diameter portion 324 may be at least 0.010 inch larger in diameter than the diameter of the main diameter portion 322 and, more preferably, at least 0.10 inch larger than the main diameter portion 322. The enlarged diameter portion 324 may extend from the bushing distal end 308 toward a location within approximately 30-80 percent of the length of the bushing bore 316. Advantageously, the enlarged diameter portion 324 may reduce the length of the drill bit 504 that is rotationally frictionally engaged to the bushing bore 316. In this manner, the enlarged diameter portion 324 of the bushing bore 316 may reduce the amount of friction and heat that would otherwise be generated if the entire length of the bushing bore 316 was frictionally engaged to the drill bit 504. In this regard, the enlarged diameter portion 324 of the bushing bore 316 may reduce the rate of wear of the drill bit 504 and the bushing 302. In addition, the large diameter portion may provide a pathway by which drilling debris or lubricant may exit the bushing bore 316.

The bushing 302 may optionally include a bushing taper 318 formed on the bushing proximal end 306. The bushing taper 318 may be formed at a bushing taper angle 320 that is complementary to the collet bore taper 226. The collet bore taper 226 may be formed at a collet bore taper angle 228 of up to approximately 30 degrees relative to the collet axis 204 and, more preferably, within the range of approximately 5-15 degrees relative to the collet axis 204. As indicated above, the bushing taper angle 320 may be substantially equivalent to or complementary (e.g., within 5 degrees) to the collet bore taper angle 228. The bushing taper 318 and the collet bore taper 226 may be configured such that when the collet fingers 210 are clamped against the inner circumferential surface 116 of the workpiece hole 110, the bushing taper 318 and collet bore taper 226 are parallel to each other within approximately 2 degrees. However, in an example not shown, the bushing taper 318 may be omitted from the bushing 302. For example, to simplify manufacturing, the bushing proximal end 306 may be formed as sharp circumferential edge or the bushing proximal end 306 may be formed as a radiused or rounded circumferential edge. The bushing 302 may be formed of heat-treated steel, hardened steel, stainless steel, tool steel, carbide alloys such as tungsten carbide, or any other metallic material or non-metallic material including ceramic material.

Figure 9:
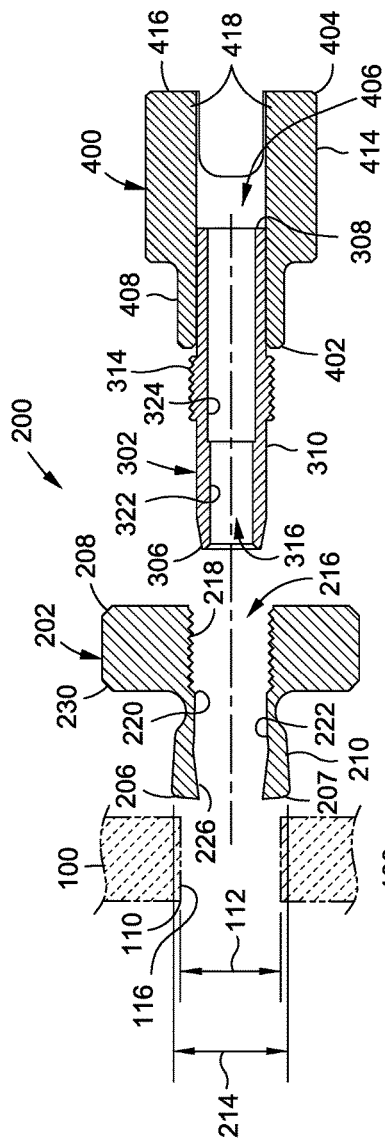
FIG. 9 is a sectional view of a further embodiment of a colleted bushing wherein the collet fingers have a collet finger diameter that is initially larger than the workpiece hole diameter.
Figure 10:
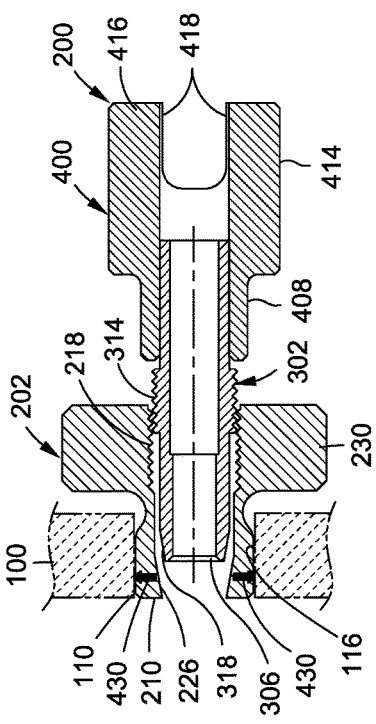
FIG. 10 is a sectional view of the colleted bushing of FIG. 9 showing the bushing threadably engaged to the collet in the workpiece hole.
Figure 11:
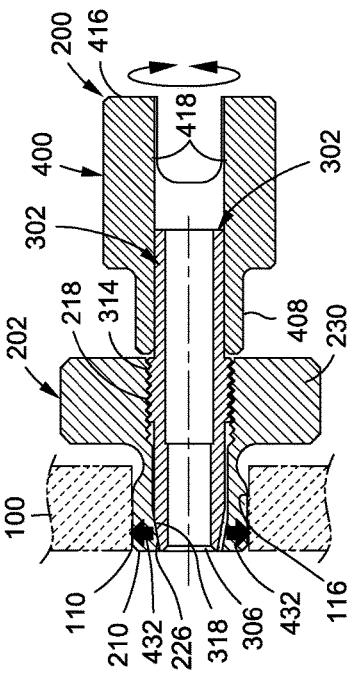
FIG. 11 is a sectional view of the colleted bushing of FIG. 10 showing the collet fingers being urged radially against the inner circumferential surface of the workpiece hole.

Referring still to FIG. 5, in some examples, the collet 202 has a collet wall thickness 224 that may be in the range of approximately 0.030-0.070 inch. For example, the collet wall thickness 224 may be in the range of approximately 0.040-0.050 inch. The collet wall thickness 224 may be a minimum at the location of the distal ends of the lengthwise slots 212 separating the collet fingers 210. Locating the collet wall thickness 224 at the distal ends of the lengthwise slots 212 defines the location at which the collet fingers 210 radially deflect outwardly into contact with the inner circumferential surface 116 of the workpiece hole 110 to lock the colleted bushing 200 within a workpiece hole 110. For the below-described configuration of the colleted bushing 200 wherein the collet fingers 210 are splayed or angled outwardly in their natural, stress-free state prior to insertion into the workpiece hole 110 as shown in FIGS. 9-11, the minimum collet wall thickness 224 dictates the location where the collet fingers 210 initially deflect radially inwardly to allow insertion of the collet 202 into the workpiece hole 110. The collet fingers 210 may each have an increased thickness throughout the length of the collet fingers 210 relative to the collet wall thickness 224 at the distal ends of the lengthwise slots 212. The increased thickness of the collet fingers 210 may provide strength to the collet fingers 210 against pressure exerted on the collet fingers 210 by the bushing taper 318 as a means to lock the colleted bushing 200 within the workpiece hole 110.

The collet 202 may include a collet flange 230 which may have a larger width or diameter than the collet finger diameter 214 collectively defined by the collet fingers 210. The collet flange 230 may have a diameter in the range of 0.75-3.0 inch or larger. The collet flange 230 may be located generally along the collet distal end 208. The collet flange 230 may have a length or thickness in the range of 0.12-2.0 inch or larger, and preferably within the range of 0.38-1.0 inch. In some examples, the collet flange 230 may be positioned such that the underside of the collet flange 230 is configured to be placed in contact against the surface the workpiece as a means to control the depth of insertion of the collet fingers 210 within the workpiece hole 110. However, in the example shown, the collet 202 is configured such that the underside of the collet flange 230 is spaced away from the surface of the workpiece when the collet fingers 210 are inserted within the full depth of the workpiece hole 110.

Referring still to FIG. 5, the collet flange 230 may have mechanical features such as indentations (not shown) and/or protuberances (not shown) on the outer circumferential surface of the collet flange 230. For example, the collet flange 230 may include knurls or other surface features configured to enable a user to grasp the collet flange 230 during installation of the colleted bushing 200 within the workpiece hole 110. The collet flange 230 may enable a user to grasp the collet 202 and hold the collet 202 in position within the workpiece hole 110. In addition, the collet flange 230 may enable the user to prevent rotation of the collet 202 using one hand while the user's other hand threadably engages the bushing 302 into the collet 202. The collet flange 230 may be circular or disc-shaped as shown in FIGS. 1-5. Alternatively, the collet flange 230 may include flats or facets (not shown). For example, although not shown, the collet flange 230 may have a hex shape, diametrically opposing flats, or any other shape that facilitate a user gripping the collet flange 230.

Although preferably configured to avoid the need for additional hand tools, the collet flange 230 may be shaped in a manner to allow the collet flange 230 to be engaged by a wrench (not shown) such as an adjustable crescent wrench or an open-end wrench. As best seen in FIGS. 4-5, the juncture of the collet flange 230 with the collet 202 may be radiused to avoid stress concentrations that may locally occur during radially outward or radial inward deflection of the collet fingers 210. The collet 202 may be formed of nickel, aluminum, bronze, or other metallic material or non-metallic material. Preferably, the collet 202 is formed of a material enabling the collet fingers 210 to resiliently radially deflect during locking engagement of the collet 202 within a workpiece hole 110.

Referring to FIGS. 1-5, the colleted bushing 200 may optionally include a bushing adapter 400 that may be removably securable to the bushing 302 to form a bushing assembly 300. As shown in the figures, the bushing 302 is longer than the collet 202 and includes additional length to allow for coupling the bushing adapter 400 to the bushing 302. In some examples, the bushing adapter 400 may include a threaded hole 410 extending transversely through one side of the bushing adapter 400. The threaded hole 410 may be configured to receive a set screw 412 for securing the bushing adapter 400 to the bushing 302.

The bushing adapter 400 may include an adapter collar 408 and an adapter body portion 414 which may be of a larger diameter than the adapter collar 408. The adapter body portion 414 may have a diameter in the range of approximately 0.50-2.0 inch or more, and a length of approximately 0.50-2.0 inch or more. The adapter collar 408 may have a wall thickness of approximately 0.030 inch or more, and a length of approximately 0.25-1.0 inch or more. The adapter collar 408 may include the threaded hole 410 for receiving the set screw 412 for removably securing the bushing adapter 400 to the bushing 302. During the attachment of the bushing assembly 300 to the bushing 302, the set screw 412 may be rotated into engagement with a flat 312 that may be formed on the bushing outer surface 310. The flat 312 may be located between the bushing threads 314 and the bushing distal end 308. In other examples, the bushing adapter 400 may be press fit onto the bushing outer surface 310. In still other examples, the bushing adapter 400 may be secured to the bushing 302 by means of a quick-release locking pin (not shown) extended diametrically through the bushing adapter 400 and the bushing 302. As may be appreciated, the bushing adapter 400 may be removably secured to the bushing 302 by any one a variety of different means. In still other examples, the bushing 302 and the bushing adapter 400 may be formed as a unitary structure (not shown).

Referring to FIGS. 4-5, the adapter has an adapter proximal end 402 and an adapter distal end 404. The adapter bore 406 is sized and configured to be inserted over the bushing outer surface 310 at the bushing distal end 308. The bushing adapter 400 has an adapter bore 406 that may extend axially from the adapter proximal end 402 toward the adapter distal end 404. In some examples, the adapter bore 406 may extend from the adapter proximal end 402 at least partially toward the adapter distal end 404. In other examples, the adapter bore 406 may extend through the entire length of the bushing adapter 400. The adapter bore 406 has a diameter that is no smaller than the diameter of the bushing outer surface 310 at the bushing distal end 308. In some examples, the adapter bore 406 may be no more than 0.010 inch larger than the diameter of the bushing outer surface 310. The bushing adapter 400 bore may be sized and configured complementary to a universally-sized diameter of the bushing outer surface 310 to allow the bushing adapter 400 to be installed on a variety of different bushings. In this regard, the bushing adapter 400 may be configured to be secured to the bushing distal end 308 of different configurations of bushings. For example, the bushing adapter 400 may be configured to be secured to bushings that have different bushing thread diameters, different bushing bore diameters, and/or different bushing taper geometries.

The bushing adapter 400 may include a bushing grasping element 416 which may be located on the adapter distal end 404. Alternatively, the bushing adapter 400 may be omitted and the grasping element may be included with or may be integrally formed with the bushing 302. In some examples, the bushing grasping element 416 may have a larger width or diameter than the diameter of the bushing outer surface 310. The bushing grasping element 416 may have a diameter approximate 0.50-3.0 inch or more, and a length or thickness of approximately 0.12-1.5 inch or more. The bushing grasping element 416 may be configured to enable a user to grasp, hold, and/or manipulate the bushing 302 or bushing adapter 400. During installation of the colleted bushing 200 in a workpiece hole 110, the bushing grasping element 416 may facilitate a user holding and rotating the bushing 302 with one hand while the user's other hand holds the collet 202 in position within the workpiece hole 110 and prevents rotation of the collet 202 relative to the workpiece hole 110.

The bushing grasping element 416 may be configured in any one of a variety of different sizes, shapes, and configurations to facilitate a user grasping the bushing adapter 400 and/or the bushing 302. In the example shown in FIGS. 1-2, 4-11, and 13-20, the bushing grasping element 416 is configured as a pair of bushing tabs 418 located on diametrically opposite sides of the bushing adapter 400. The bushing tabs 418 extend axially outwardly from the adapter distal end 404 of the bushing adapter 400 and are configured to enable a user to grasp the bushing tabs 418 with the user's hand such as by using the thumb and forefinger. In an alternative embodiment shown in FIG. 3, the bushing grasping element 416 may be configured as a bushing circular flange 420. The bushing circular flange 420 may be provided with mechanical surface features such as depressions and/or protuberances. In one example, the outer circumferential surface of the bushing circular flange 420 may include knurls or other surface features configured to enable a user to grasp the bushing circular flange 420 and rotate the bushing adapter 400. Although preferably configured to avoid the need for additional hand tools, the bushing grasping element 416 may be shaped or configured to facilitate engagement with a wrench such as an adjustable crescent wrench, an open-end wrench, or a socket wrench. The bushing adapter 400 may be formed of metallic material or nonmetallic material. For example, the bushing adapter 400 may be formed of steel such as 4340 alloy steel or tool steel. However, the bushing adapter 400 may be formed of any suitable material which is preferably highly wear resistant and non-galling.

Referring to FIGS. 6-8, shown is a sequence of steps illustrating the installation of a colleted bushing 200 into a workpiece hole 110. In FIG. 6, the collet fingers 210 are in a stress-free, undeflected state prior to insertion of the collet fingers 210 into the workpiece hole 110. The collet fingers 210 collectively define the above-mentioned collet finger diameter 214 which, in FIG. 6, is no larger than the workpiece hole diameter 112. Preferably, the collet finger diameter 214 is equivalent to or slightly smaller than the workpiece hole diameter 112 prior to insertion of the collet fingers 210 into the workpiece hole 110. For example, in the stress-free state prior to insertion into the workpiece hole 110, the collet finger diameter 214 is preferably no more than approximately 0.050 inch smaller than the workpiece hole diameter 112.

FIG. 7 shows the collet 202 installed in the workpiece hole 110 and the bushing 302 initially threadably engaged to the collet 202. The collet 202 may be inserted into the workpiece hole 110 prior to threadably engaging the bushing 302 to the collet 202. Alternatively, the bushing 302 may be threadably engaged to the collet 202 prior to insertion of the collet 202 into the workpiece hole 110. Preferably, to provide mechanical stability of the bushing 302 relative to the collet 202, the bushing 302 is sized and configured such that at least three of the bushing threads 314 are engaged to the collet threads 218 prior to the bushing proximal end 306 contacting the collet bore taper 226. In addition, the engagement of a minimum quantity of the bushing threads 314 with the collet threads 218 may allow the collet threads 218 and bushing threads 314 to resist the axial force generated when the bushing proximal end 306 contacts the collet bore taper 226 causing the pressuring of the collet fingers 210 against the inner circumferential surface 116 of the workpiece hole 110.

FIG. 8 illustrates the bushing threads 314 engaged to the collet threads 218 such that the bushing proximal end 306 is in direct physical contact with the collet bore taper 226 causing the collet fingers 210 to be deflected radially outwardly into direct physical contact with the inner circumferential surface 116 of the workpiece hole 110. With the bushing proximal end 306 in contact with the collet bore taper 226, further rotation of the bushing 302 relative to the collet 202 causes the collet fingers 210 to be further urged radially outwardly to generate a final clamping pressure 432 of the collet fingers 210 against the inner circumferential surface 116 of the workpiece hole 110, thereby concentrically locking the colleted bushing 200 within the workpiece hole 110.

As shown in FIG. 6-8, the collet bore 216 may include a step 220 limiting a depth of insertion of the bushing 302 within the collet 202. The step 220 may define the point of separation of the collet bore main portion 222 from the collet threads 218. The collet bore main portion 222 may extend from the collet bore taper 226 to the collet threads 218. In one example, the step 220 may be positioned within the collet bore 216 at a location that prevents the bushing proximal end 306 from protruding past the collet proximal end 206, and which would otherwise result in the bushing proximal end 306 interfering with the rotary cutting tool 502 (e.g., a drill bit 504—FIGS. 15-16) being guided by the colleted bushing 200. For example, the step 220 may prevent the bushing proximal end 306 from protruding past the collet proximal end 206 which would otherwise interfere with the ability of the fluted section 510 (FIG. 19) of a core drill bit 506 to drill completely through layers of material located immediately adjacent to the workpiece hole 110 containing the colleted bushing 200.

Referring to FIGS. 9-11, shown is a sequence of steps illustrating the installation of a colleted bushing 200 into a workpiece hole 110 in an embodiment in which the collet finger diameter 214 is initially larger (e.g., by up to 0.050 inch or more) than the workpiece hole diameter 112. As shown in FIG. 9, the collet 202 may be manufactured in a manner such that the collet fingers 210 in a stress-free, undeflected state are initially angled outwardly prior to insertion of the collet fingers 210 into the workpiece hole 110. To insert the collet 202 into the workpiece hole 110, the collet fingers 210 may be radially contracted inwardly until the collet finger diameter 214 is no larger than the workpiece hole diameter 112. Radially inward contraction of the collet fingers 210 may be facilitated by a collet chamfer 207 that may be formed on the outer circumferential edge of the collet proximal end 206, causing the radial contraction of the collet fingers 210 as the collet 202 is forced into the workpiece hole 110.

FIG. 10 shows the collet 202 inserted into the workpiece hole 110 and the bushing 302 initially threadably engaged to the collet 202. The collet fingers 210 have a tendency to return to their original stress-free, undeflected state (e.g., FIG. 9) causing the collet fingers 210 to exert an initial clamping pressure 430 against the inner circumferential surface 116 of the workpiece hole 110 prior to the bushing proximal end 306 contacting the collet bore taper 226. Advantageously, the initial clamping pressure 430 exerted by the collet fingers 210 against the workpiece hole 110 may eliminate the need for a user to manually hold the collet 202 in position inside the workpiece hole 110 while the user inserts the bushing 302 inside the collet 202 and threadably engages the bushing threads 314 to the collet threads 218. In this regard, the initial clamping pressure 430 exerted by the collet fingers 210 against the inner circumferential surface 116 of the workpiece hole 110 is advantageous for confined locations with limited space for both hands of the user to respectively hold the bushing 302 and the collet 202 during installation. In addition, the initial clamping press is advantageous for locations where the collet 202 may fall out of the workpiece hole 110 unless the user continues to hold the collet 202 inside the workpiece hole 110 with one hand while rotating the bushing 302 with the other hand until the bushing proximal end 306 engages the collet bore taper 226.

FIG. 11 shows the collet fingers 210 urged radially against the inner circumferential surface 116 of the workpiece hole 110. As indicated above, rotation of the bushing 302 relative to the collet 202 causes the collet fingers 210 to be further urged radially outwardly to provide a final clamping pressure 432 of the collet fingers 210 against the inner circumferential surface 116 of the workpiece hole 110. The final clamping pressure 432 concentrically locks the colleted bushing 200 within the workpiece hole 110.

Figure 12:
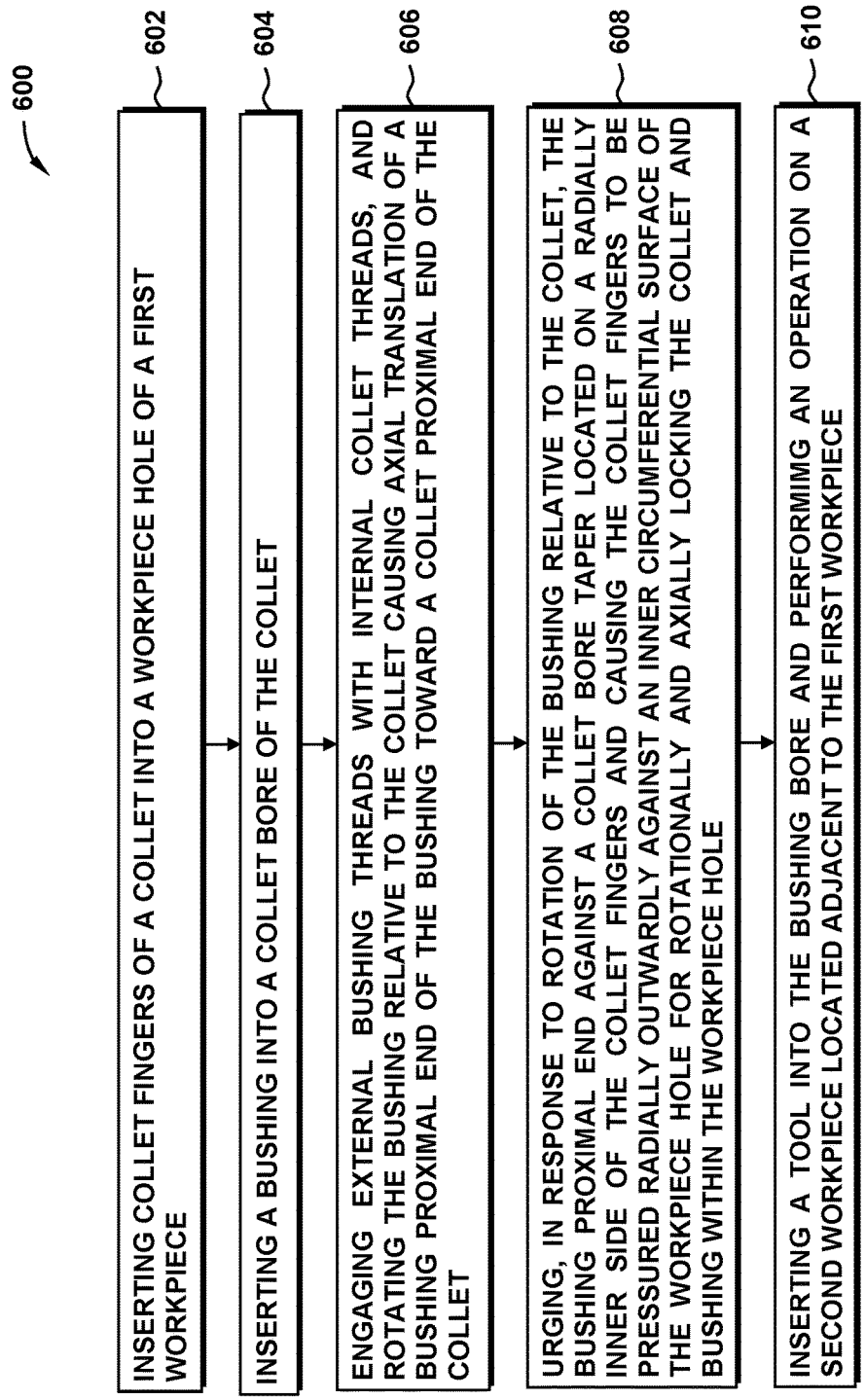
FIG. 12 is a flowchart including one or more operations of a method of performing a rotary cutting operation on one or more workpieces.

Referring now to FIGS. 12-20, shown in FIG. 12 is a flowchart including one or more operations in a method 600 of performing an operation such as a rotary cutting operation on one or more workpieces. As mentioned above, the method is described in the context of performing a rotary cutting operation using the colleted bushing 200. The colleted bushing 200 is locked within a workpiece hole 110 of an outer layer of a first workpiece 100 for forming an aligned hole through a pair of outer layers of a first workpiece 100 and through an inner layer 124 of a second workpiece 120 sandwiched between the outer layers of the first workpiece 100, as sequentially illustrated in FIGS. 13-20. As indicated above, the presently-disclosed method is not limited to aligned drilling or enlarging of a hole, but may be implemented for performing any one a variety of operations including, but not limited to, rotary cutting operations including reaming a hole, countersinking a hole, counterboring a hole, back-spotfacing a hole, forming threads in a hole using a tap, or any one a variety of other operations wherein a tool is inserted into and/or held in position or guided by the presently-disclosed colleted bushing 200.

Figure 13:
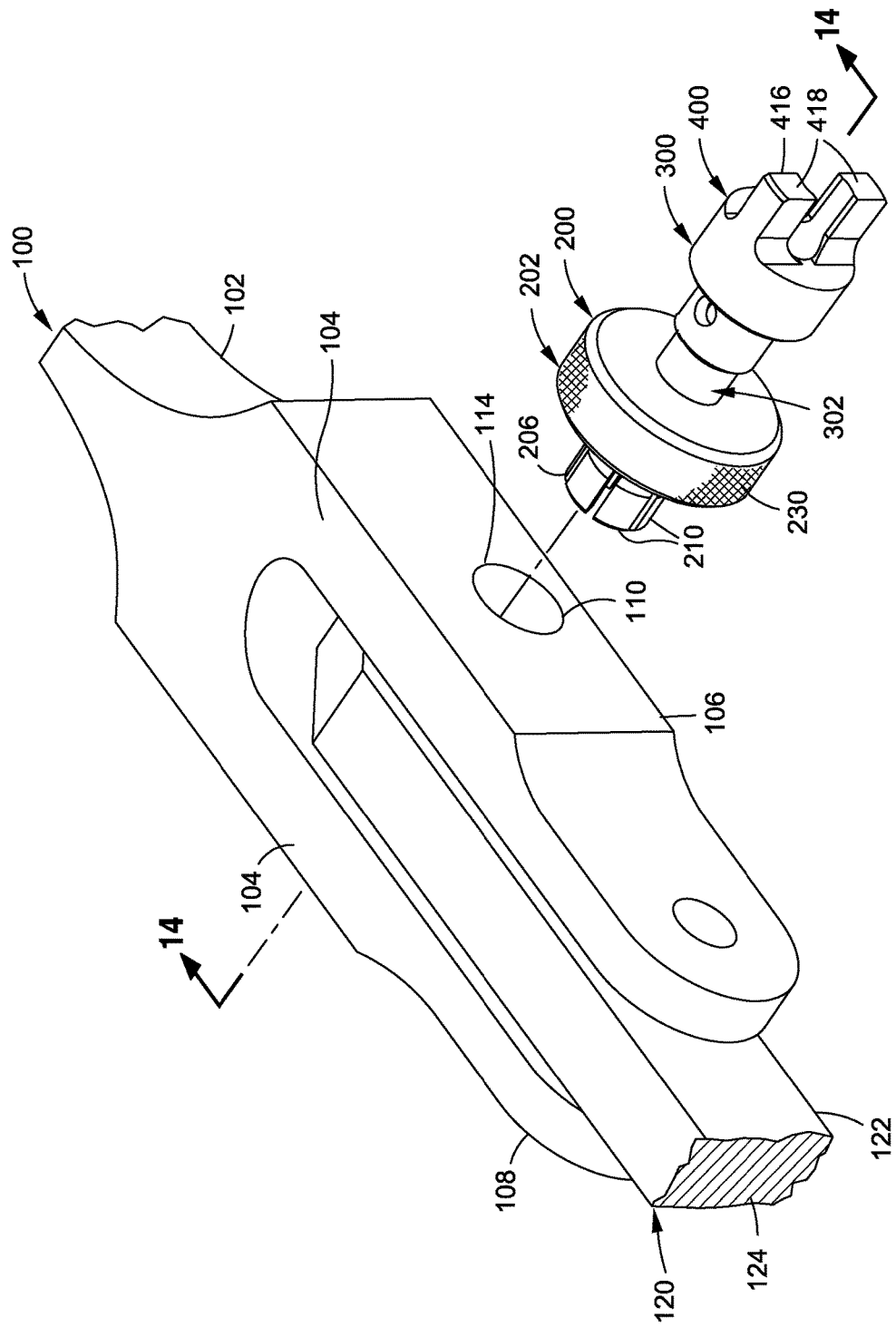
FIG. 13 is a perspective view of an example of a colleted bushing prior to insertion into a workpiece hole in a first outer layer of a first workpiece which is configured as a clevis fitting.

FIG. 13 shows a colleted bushing 200 prior to insertion into a workpiece hole 110 in a first outer layer 106 of a first workpiece 100. The first workpiece 100 is configured as a clevis fitting 102 having a spaced pair of fitting flanges 104. The fitting flanges 104 include the first outer layer 106 and a second outer layer 108 separated by a spacing. The spacing is sized to receive a flange of a stringer 122. The stringer 122 comprises an inner layer 124 sandwiched between the first outer layer 106 and the second outer layer 108. The method 600 may include drilling a workpiece hole 110 in the first outer layer 106 and in the second outer layer 108 of the first workpiece 100. The workpiece holes 110 may be drilled as a near-full-size hole 114 (FIGS. 14-18). The workpiece holes 110 may be of a diameter that is approximately (e.g., within 0.060 inch) equivalent to the diameter of a fluted section diameter of a core drill bit 506 as shown in FIG. 16 and described below. The method 600 may additionally include drilling a pilot hole 126 through the inner layer 124 of the second workpiece 120 which is located adjacent to (e.g., between) the outer layer of the first workpiece 100. In the present example, the pilot hole 126 in the inner layer 124 is smaller than the diameter of the near-full-size workpiece holes 110 in the first outer layer 106 and the second outer layer 108, and larger than the main diameter portion 322 of the bushing bore 316 in the bushing 302.

Figure 14:
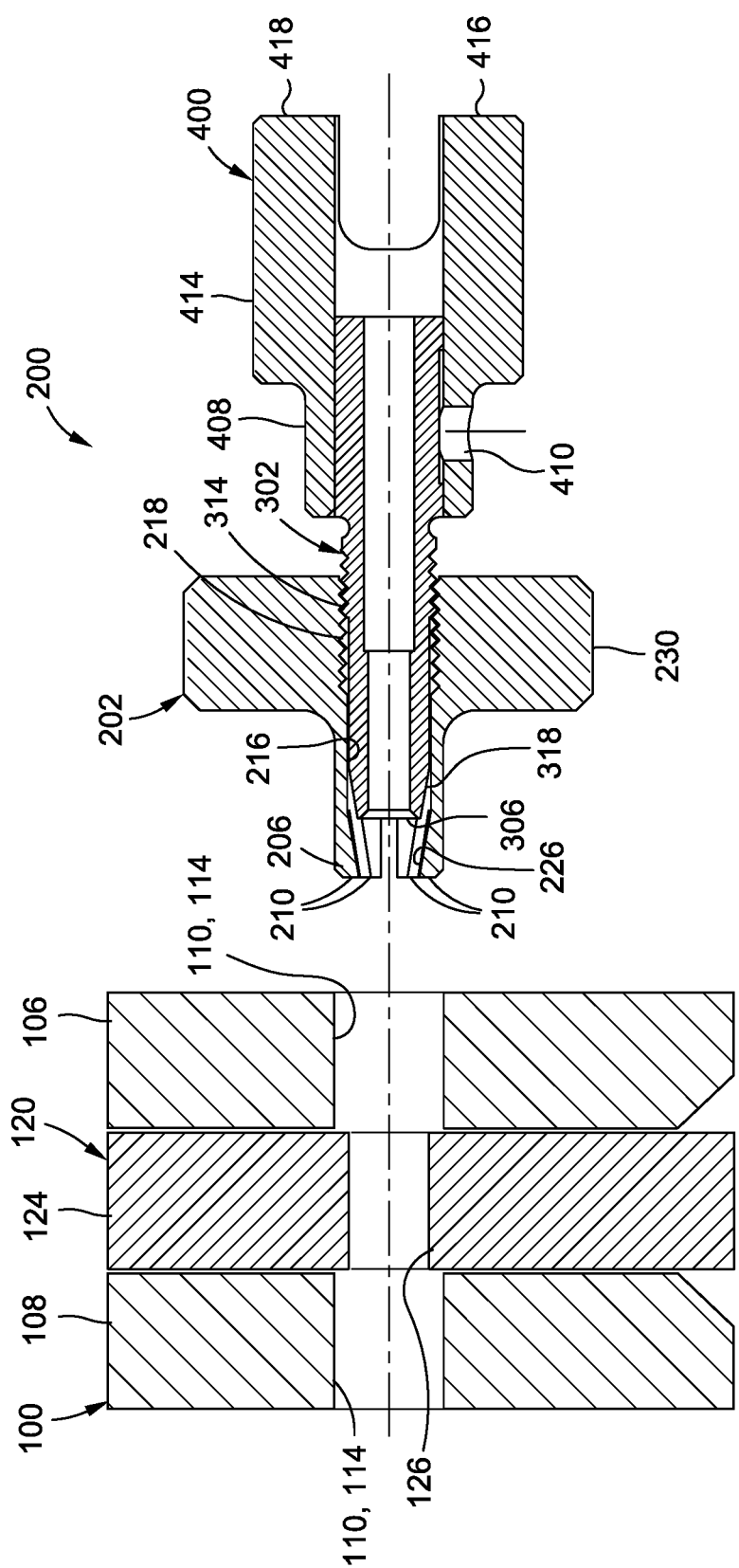
FIG. 14 is a sectional view taken along line 14 of FIG. 13 and showing the first outer layer and second outer layer of the first workpiece and an inner layer of a second workpiece and further showing the colleted bushing prior to insertion into the workpiece hole of the first outer layer.

Step 602 of the method 600 includes inserting the collet fingers 210 of the colleted bushing 200 into the near-full-size workpiece hole 110 in the first outer layer 106 of the first workpiece 100. The method may include holding the collet flange 230 of the collet 202 when inserting the collet fingers 210 into the workpiece hole 110. FIG. 14 is a sectional view of the assembly of FIG. 13 showing the first outer layer 106 and the second outer layer 108 of the first workpiece 100, and the inner layer 124 of the second workpiece 120. Also shown is the colleted bushing 200 prior to insertion into the workpiece hole 110 of the first outer layer 106. In FIGS. 9-11 and 14, the collet finger diameter 214 of the collet fingers 210 in an undeflected state (e.g., prior to insertion into the workpiece hole 110) are no larger than the diameter of the workpiece hole 110, such that the collet fingers 210 may be inserted directly into the workpiece hole 110 without first radially contracting the collet fingers 210.

However, in the example of FIGS. 9-11, the collet finger diameter 214 of the collet fingers 210 in an undeflected state is larger than the diameter of the workpiece hole 110. In arrangements in which the collet finger diameter 214 is initially larger than the workpiece hole 110, the method includes radially contracting the collet fingers 210 during insertion of the collet fingers 210 into the workpiece hole 110. The collet finger diameter 214 may be reduced to a diameter no larger than the workpiece hole diameter 112. As indicated above, the radial contraction of the collet fingers 210 may be manually performed by the user radially squeezing the collet fingers 210 to reduce the collet finger diameter 214, or by the user axially forcing the collet fingers 210 into the workpiece hole 110, causing the collet fingers 210 to radially contract as a result of contact of a collet chamfer 207 on the circumferential edge of the collet fingers 210 with the circumferential edge of the workpiece hole 110.

Figure 15:
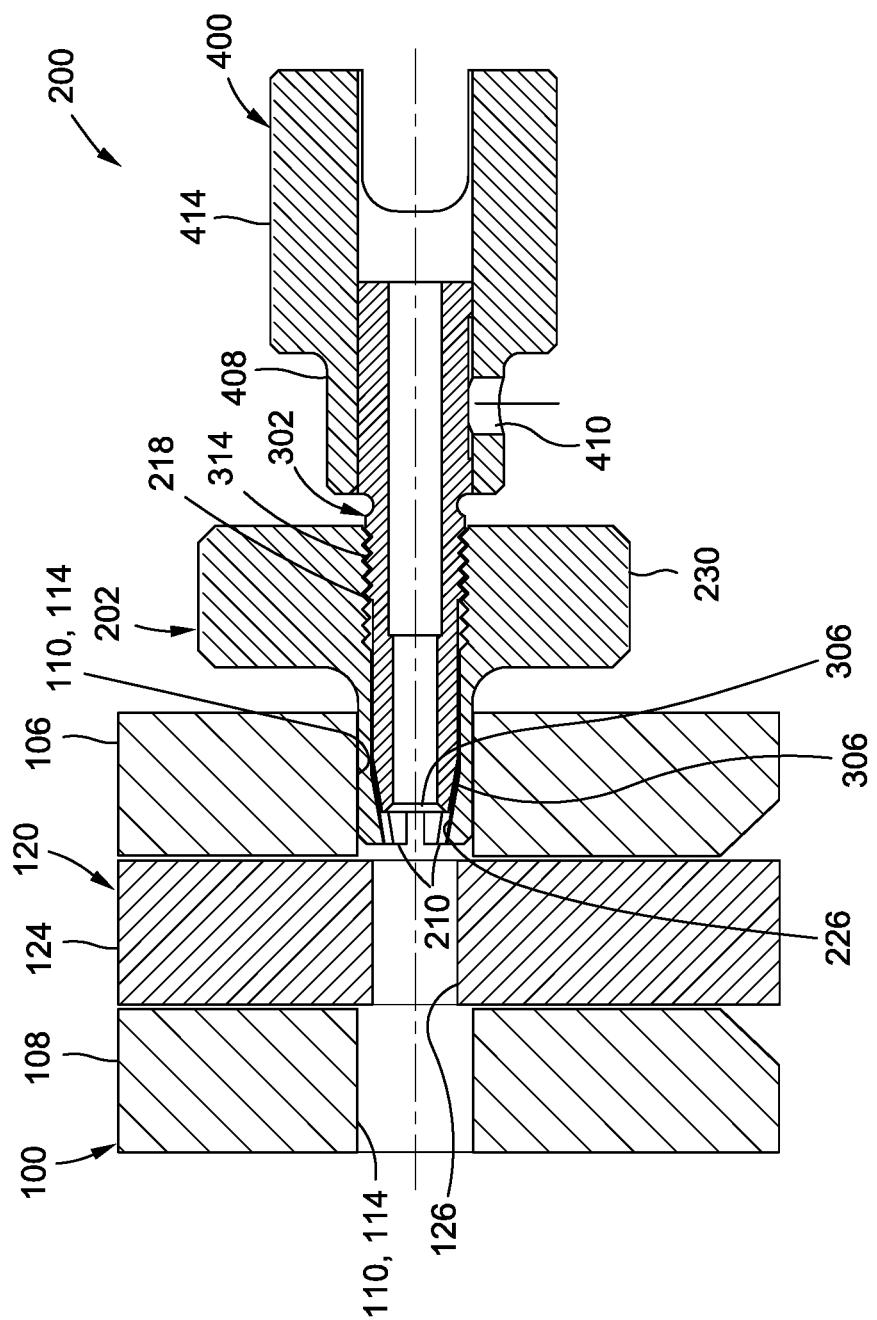
FIG. 15 is a sectional view of the first workpiece and second workpiece and showing the insertion of the collet fingers into the workpiece hole of the first outer layer of the first workpiece.

Step 604 of the method 600 includes inserting the bushing 302 into the collet bore 216 of the collet 202. As indicated earlier, the bushing 302 may be inserted into the collet bore 216 either prior to or after inserting the collet 202 into the workpiece hole 110. The above-described FIG. 14 illustrates the bushing 302 inserted into the collet 202 prior to inserting the collet 202 into the workpiece hole 110. The method may include coupling the bushing adapter 400 to the bushing 302 as shown in FIGS. 14-15. The step of coupling the bushing adapter 400 to the bushing 302 may include securing the bushing adapter 400 to the bushing 302 using a set screw 412 (FIG. 2) threaded into the threaded hole 410 located on one side of the bushing adapter 400. Alternatively, the bushing adapter 400 may be press fit onto the bushing 302, or the bushing adapter 400 may be otherwise secured to the bushing 302. The step of coupling the bushing adapter 400 to the bushing 302 may include coupling the adapter collar 408 to the bushing 302. In this regard, the threaded hole 410 may be formed in the adapter collar 408 for receiving the set screw 412.

Step 606 of the method 600 includes engaging the external bushing threads 314 on the bushing outer surface 310 with the internal collet threads 218 in the collet bore 216, and rotating the bushing 302 relative to the collet 202 causing axial translation of the bushing proximal end 306 toward the collet proximal end 206. In this regard, the method may include using one hand to grasp the collet flange 230 to prevent rotation of the collet 202 relative to the workpiece hole 110, while using the other hand to grasp and rotate the bushing 302 relative to the collet 202. The grasping and rotating of the bushing 302 may be performed by grasping and rotating the bushing grasping element 416 located on the adapter distal end 404 of the bushing adapter 400. As indicated above, the bushing grasping element 416 may be configured as a pair of bushing tabs 418 located on diametrically opposite sides of the bushing adapter 400. The bushing tabs 418 enable a user to grasp and rotate the bushing tabs 418 with the user's hand (e.g., using the thumb and fingers). In another example, the bushing grasping element 416 may be configured as a bushing circular flange 420 (FIG. 3) having knurls or other surface features configured to enable a user to grasp and rotate the bushing circular flange 420.

FIG. 14 shows the bushing threads 314 engaged to the collet threads 218. In FIG. 14, the bushing proximal end 306 is in non-contacting relation to the collet bore taper 226. FIG. 15 shows the collet fingers 210 inside the workpiece hole 110 and the bushing proximal end 306 in contact with the collet bore taper 226 after further rotation of the bushing 302 relative to the collet 202. The method 600 may include engaging at least three of the collet threads 218 with the bushing threads 314 when the bushing 302 terminal end contacts the collet bore taper 226 to provide mechanical stability of the bushing 302 relative to the collet 202.

The method 600 may additionally include limiting, using the step 220 (FIGS. 4-5) located within the collet bore 216, the depth of insertion of the bushing 302 within the collet 202. As described above, the step 220 may separate the collet bore main portion 222 from the collet threads 218. In one example, the step 220 may be positioned at a location that prevents the bushing proximal end 306 from protruding past the collet proximal end 206 which would otherwise interfere with the fluted section 510 (FIG. 19) being able to drill completely through the inner layer 124.

Step 608 of the method 600 includes urging, in response to rotation of the bushing 302 relative to the collet 202, the bushing proximal end 306 against the collet bore taper 226. As indicated above, rotation of the bushing 302 relative to the collet 202 causes axial translation of the bushing proximal end 306 until the bushing proximal end 306 contacts the collet bore taper 226 as shown in FIG. 15. With the bushing proximal end 306 contacting the collet bore taper 226, further rotation of the bushing 302 causes the collet fingers 210 to be pressured uniformly radially outwardly against the inner circumferential surface 116 of the workpiece hole 110. Pressuring of the collet fingers 210 radially outwardly against the inner circumferential surface 116 the workpiece hole 110 rotationally and axially blocks the colleted bushing 200 concentrically within the workpiece hole 110.

Figure 18:
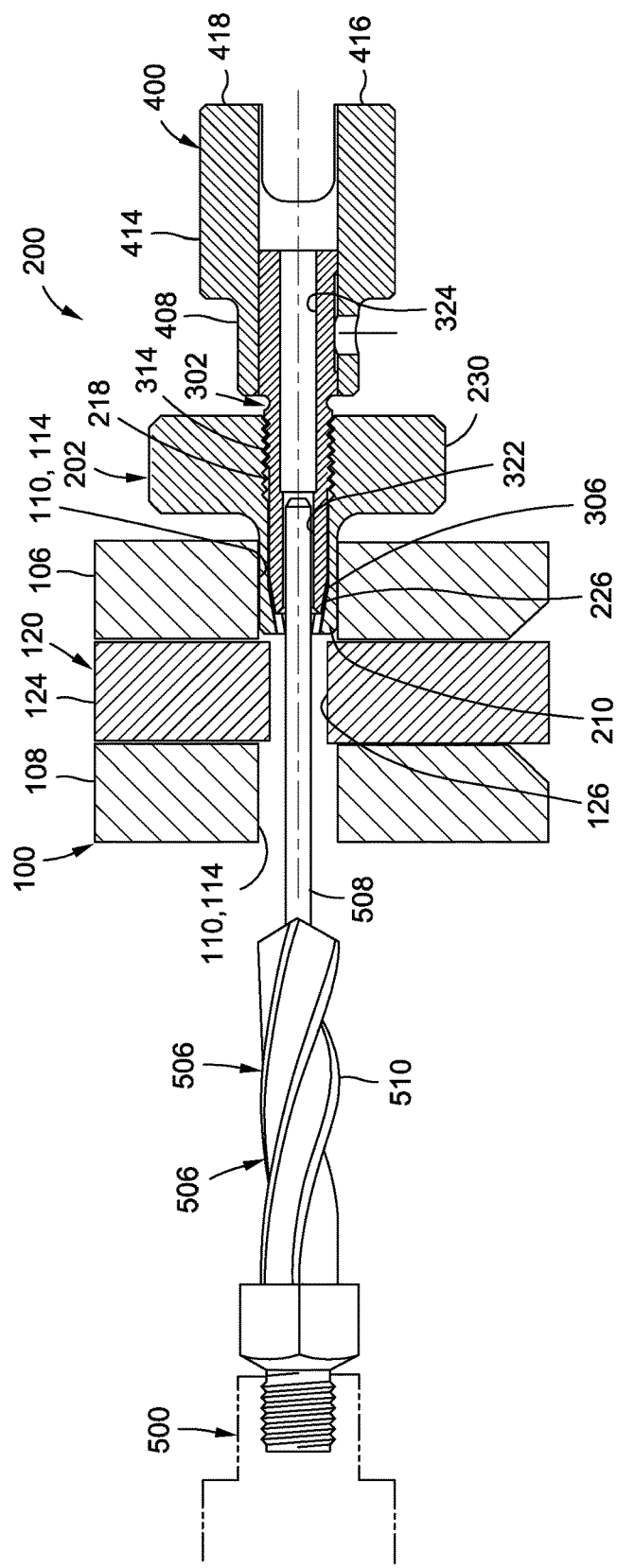
FIG. 18 is a sectional view of the first workpiece and second workpiece and showing the piloted section of the core drill bit rotatably supported by the bushing bore of the colleted bushing.

Step 610 of the method 600 includes inserting a rotary cutting tool 502 into the bushing bore 316 and performing a rotary cutting operation on a second workpiece 120. Referring to FIG. 16, shown is a power drill 500 for rotating a rotary cutting tool 502 configured as a core drill bit 506. FIG. 17 is a side view of the core drill bit 506 which has a fluted section 510 and a piloted section 508 extending axially outwardly from the fluted section 510. The core drill in FIG. 16-17 is configured for enlarging the pilot hole 126 in the inner layer 124. In the example of FIG. 18, the step of inserting a rotary cutting tool 502 (e.g., the piloted section 508 of the core drill bit 506) into a bushing bore 316 and drilling a hole in a second workpiece 120 includes inserting the piloted section 508 of the core drill bit 506 through the pilot hole 126 in the inner layer 124 (i.e., the second workpiece 120) and into the main diameter portion 322 of the bushing bore 316 of the bushing 302. As can be seen, the piloted section 508 is rotatably supported by the bushing bore 316 of the colleted bushing 200.

Figure 19:
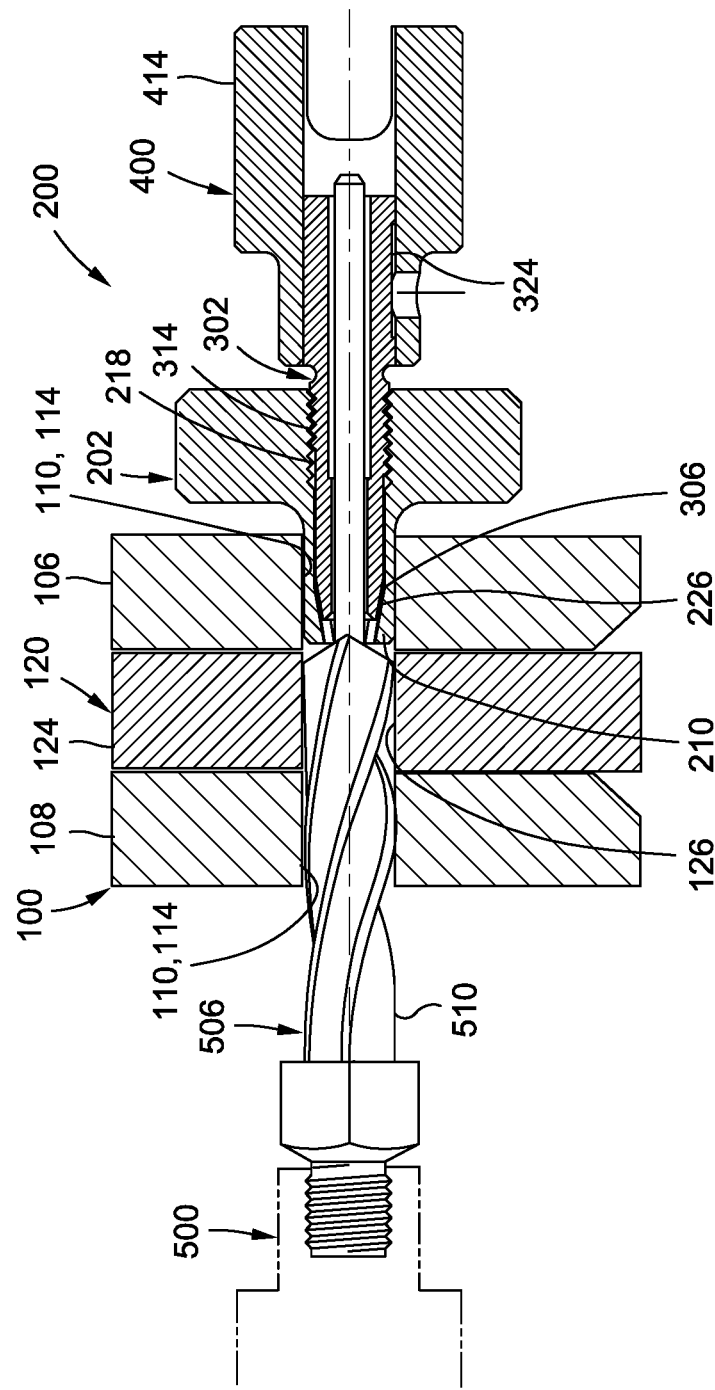
FIG. 19 is a sectional view of the first workpiece and second workpiece and showing the fluted section of the core drill bit after enlarging the hole in the inner layer of the second workpiece while the piloted section of the core drill bit is rotatably supported by the bushing bore of the colleted bushing.

Referring to FIG. 19, the method 600 may include enlarging, using the fluted section 510 of the core drill bit 506, the pilot hole 126 in the inner layer 124 while the piloted section 508 is rotationally supported by the bushing bore 316. The fluted section 510 of the core drill bit 506 may enlarge the pilot hole 126 in the inner layer 124 to a diameter that is substantially equivalent to the diameter of the near-full-size workpiece holes 110 in the first outer layer 106 and the second outer layer 108.

The step of inserting the piloted section 508 of the core drill bit 506 into the bushing bore 316 includes rotationally supporting the piloted section 508 in the main diameter portion 322 of the bushing bore 316. In some examples, the colleted bushing 200 may be configured such that the bushing 302 includes an enlarged diameter portion 324 extending from the main diameter portion 322 to the bushing distal end 308. In configurations having an enlarged diameter portion 324, the method may include reducing, via the enlarged diameter portion 324, the amount of friction between the piloted section 508 and the bushing bore 316 relative to the amount of friction that would otherwise occur if the enlarged diameter portion 324 were omitted from the bushing bore 316.

Figure 20:
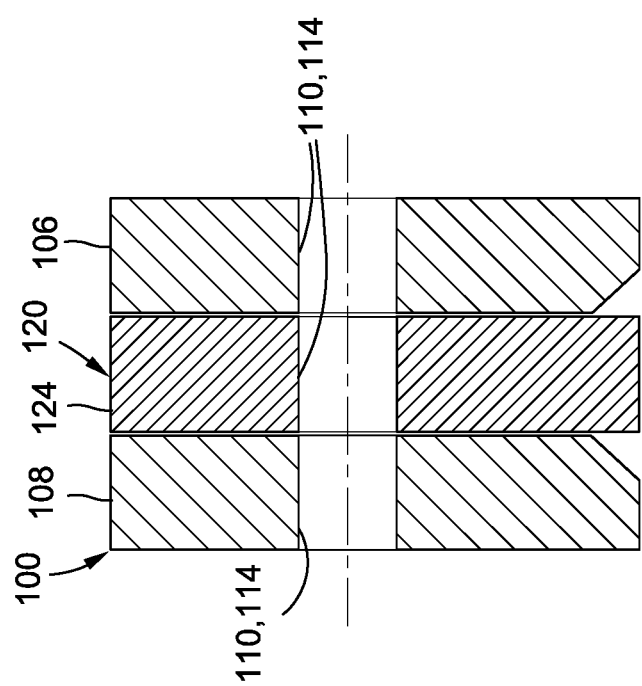
FIG. 20 is a sectional view of the first workpiece and second workpiece after removal of the core drill bit and the colleted bushing.

Referring to FIG. 20, the method 600 may further include removing the core drill bit 506 and the colleted bushing 200 from the first workpiece 100 and second workpiece 120 and enlarging, using a reamer or a full-size drill bit 504 (not shown), the hole in the first outer layer 106, the inner layer 124, and the second outer layer 108. Advantageously, the colleted bushing 200 allows for aligned drilling of a hole through the first workpiece 100 and the second workpiece 120 while both of the user's hands are on the power drill 500 to support and guide the power drill 500 during the drilling of the hole. In this manner, the colleted bushing 200 enables a user to more accurately control the operation of the power drill 500 and more accurately control the angularity of the drill bit 504 relative to the workpieces.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A colleted bushing, comprising:
    a collet having a collet proximal end and a collet bore having a collet axis and collet threads formed along a section of the collet bore, and a collet bore taper located adjacent the collet proximal end, the collet including a plurality of collet fingers located adjacent the collet proximal end and configured to be inserted into a workpiece hole of a workpiece, the collet having a collet flange of a larger width than a collet diameter collectively defined by the collet fingers, the collet flange having an underside defining a planar annular surface configured to be placed in contact against a surface of the workpiece when the collet is installed in the workpiece hole and thereby preventing pivoting of the collet within the workpiece hole and maintaining perpendicularity of the collet axis relative to the surface of the workpiece;
    a bushing having a bushing proximal end, a bushing bore, a bushing outer surface, and bushing threads formed along a section of the bushing outer surface; and
    the bushing configured to be inserted into the collet bore and the bushing threads configured to engage the collet threads in a manner resulting in simultaneous rotational and axial movement of the bushing relative to the collet until the bushing proximal end contacts the collet bore taper causing the collet fingers to be urged radially outwardly and removably locking the collet within the workpiece hole, the bushing bore configured to receive and guide a tool.

2. The colleted bushing of claim 1 wherein:
the collet fingers collectively define a collet finger diameter that is no larger than a diameter of the workpiece hole prior to insertion of the collet fingers into the workpiece hole.

3. The colleted bushing of claim 1 wherein:
the collet fingers are initially angled outwardly prior to insertion of the collet fingers into the workpiece hole.

4. The colleted bushing of claim 1 wherein:
the collet bore includes a step limiting a depth of insertion of the bushing within the collet.

5. The colleted bushing of claim 1 wherein:
the bushing has a bushing taper formed adjacent the bushing proximal end and configured to engage the collet bore taper.

6. The colleted bushing of claim 1 wherein:
the bushing bore has a main diameter portion and an enlarged diameter portion extending from a bushing distal end toward a location approximately 30-80 percent of a length of the bushing.

7. The colleted bushing of claim 1 further including:
a bushing adapter securable to the bushing, and having an adapter proximal end, an adapter distal end, a bushing grasping element on the adapter distal end, and an adapter bore sized and configured to be inserted over the bushing outer surface at a bushing distal end; and
the bushing grasping element having a larger width or diameter than the bushing to enable one hand of a user to grasp the bushing grasping element and rotate the bushing while an opposite hand of the user grasps the collet to prevent rotation of the collet relative to the workpiece hole.

8. The colleted bushing of claim 7 wherein:
the bushing adapter comprises an adapter collar and an adapter body portion of larger diameter than the adapter collar;
the adapter body portion including the bushing grasping element; and
the adapter collar including a threaded hole configured to receive a set screw for removably securing the bushing adapter to the bushing.

9. The colleted bushing of claim 7 wherein the bushing grasping element comprises at least one of the following:
at least one pair of bushing tabs located on opposite sides of the bushing adapter; and
a bushing circular flange.

10. A colleted bushing for drilling a hole in a workpiece, comprising:
a collet having a collet proximal end and a collet bore having a collet axis and collet threads formed along a section of the collet bore, and a collet bore taper located adjacent the collet proximal end, the collet including a plurality of collet fingers located adjacent the collet proximal end and configured to be inserted into a workpiece hole of a workpiece, the collet having a collet flange of a larger width than a collet diameter collectively defined by the collet fingers, the collet flange having an underside defining a planar annular surface configured to be placed in contact against a surface of the workpiece when the collet is installed in the workpiece hole and thereby preventing pivoting of the collet within the workpiece hole and maintaining perpendicularity of the collet axis relative to the surface of the workpiece;
a bushing having a bushing proximal end, a bushing distal end, a bushing bore, a bushing outer surface, and bushing threads formed along a section of the bushing outer surface;
a bushing adapter configured to be removably coupled to the bushing distal end; and
the bushing threads configured to engage the collet threads via the bushing adapter in a manner resulting in simultaneous rotational and axial movement of the bushing relative to the collet until the bushing proximal end contacts the collet bore taper causing the collet fingers to be urged radially outwardly and removably locking the collet within the workpiece hole, the bushing bore configured to receive and guide a rotary cutting tool.

11. A method of performing an operation on one or more workpieces, comprising:
inserting collet fingers of a collet into a workpiece hole of a first workpiece until a planar annular surface of an underside of a collet flange is in contact against a surface of the first workpiece to thereby prevent pivoting of the collet within the workpiece hole and maintaining perpendicularity of a collet axis relative to the surface of the workpiece;
inserting a bushing into a collet bore of the collet;
engaging external bushing threads of the bushing with internal collet threads of the collet bore and rotating the bushing relative to the collet causing axial translation of a bushing proximal end toward a collet proximal end;
urging, in response to rotation of the bushing relative to the collet, the bushing proximal end against a collet bore taper located on a radially inner side of the collet fingers and causing the collet fingers to be pressured uniformly radially outwardly against an inner circumferential surface of the workpiece hole for rotationally and axially locking the collet and bushing concentrically within the workpiece hole; and
inserting a tool into the bushing bore and performing an operation on a second workpiece located adjacent to the first workpiece.

12. The method of claim 11 wherein the collet fingers prior to insertion into the workpiece hole collectively define a collet finger diameter that is larger than a diameter of the workpiece hole, the method further including:
radially contracting the collet fingers during insertion of the collet fingers into the workpiece hole.

13. The method of claim 11 further including:
limiting, using a step in the collet bore, a depth of insertion of the bushing within the collet.

14. The method of claim 11 further including:
grasping the collet flange of the collet when inserting the collet fingers into the workpiece hole; and
preventing rotation of the collet relative to the workpiece hole when rotating the bushing relative to the collet.

15. The method of claim 11 further including:
coupling a bushing adapter to the bushing; and
grasping and rotating the bushing adapter to rotate the bushing relative to the collet.

16. The method of claim 15 wherein the step of coupling the bushing adapter to the bushing comprises:
coupling an adapter collar of the bushing adapter to the bushing.

17. The method of claim 15 wherein the step of grasping and rotating the bushing adapter comprises:

grasping and rotating a bushing grasping element located on an adapter distal end of the bushing adapter, the bushing grasping element comprising at least one of the following:

at least one pair of bushing tabs located on diametric opposite sides of the bushing adapter and extending axially from the adapter distal end; and a bushing circular flange located adjacent the adapter distal end.

18. The method of claim 11 wherein the step of inserting a tool into the bushing bore and performing an operation on a second workpiece located adjacent to the first workpiece comprises:

inserting a piloted section of a core drill bit through a pilot hole in an inner layer and into a bushing bore of the bushing; and enlarging, using a fluted section of the core drill bit, the pilot hole in the inner layer while the piloted section is rotationally supported within the bushing bore.

19. The method of claim 18 wherein the step of inserting the piloted section of the core drill bit into the bushing bore includes:

rotationally supporting the piloted section in a main diameter portion of the bushing bore having an enlarged diameter portion extending from the main diameter portion to a bushing distal end; and reducing, using the bushing with the enlarged diameter portion, an amount of friction between the piloted section and the bushing bore relative to the amount of friction occurring if the piloted section extended along an entire length of the bushing bore.

* * * * *